Nov. 23, 1937.   F. F. WAECHTER ET AL   2,099,914
METHOD OF AND APPARATUS FOR INFLUENT SUPPLY
Filed May 13, 1936   2 Sheets-Sheet 1
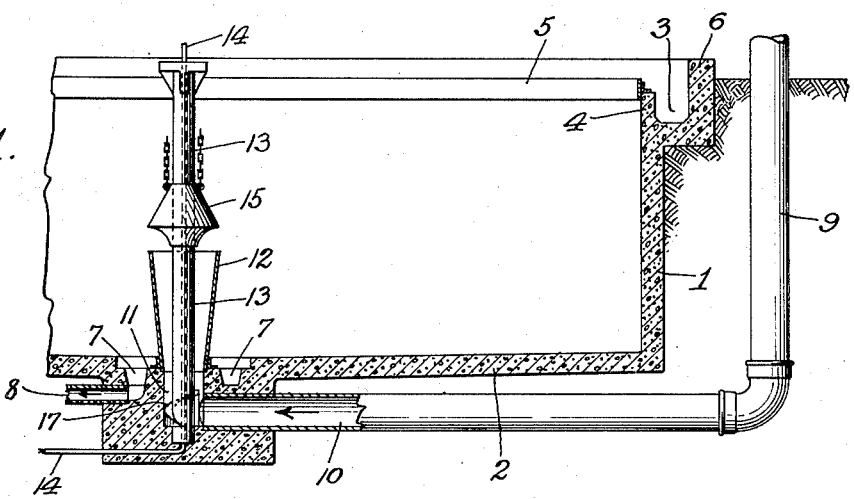
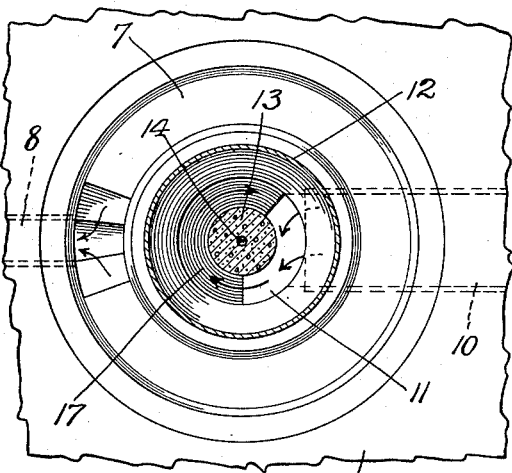
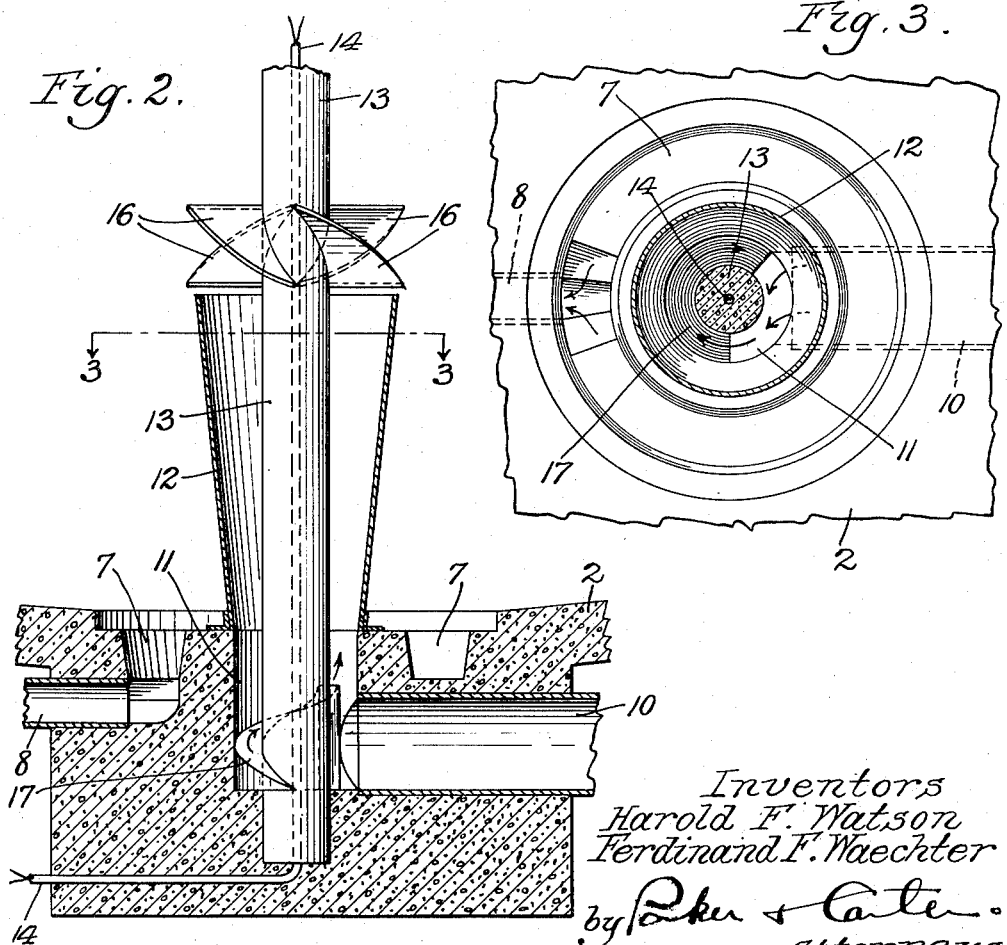
Inventors
Harold F. Watson
Ferdinand F. Waechter
by Parker & Carter
Attorneys.

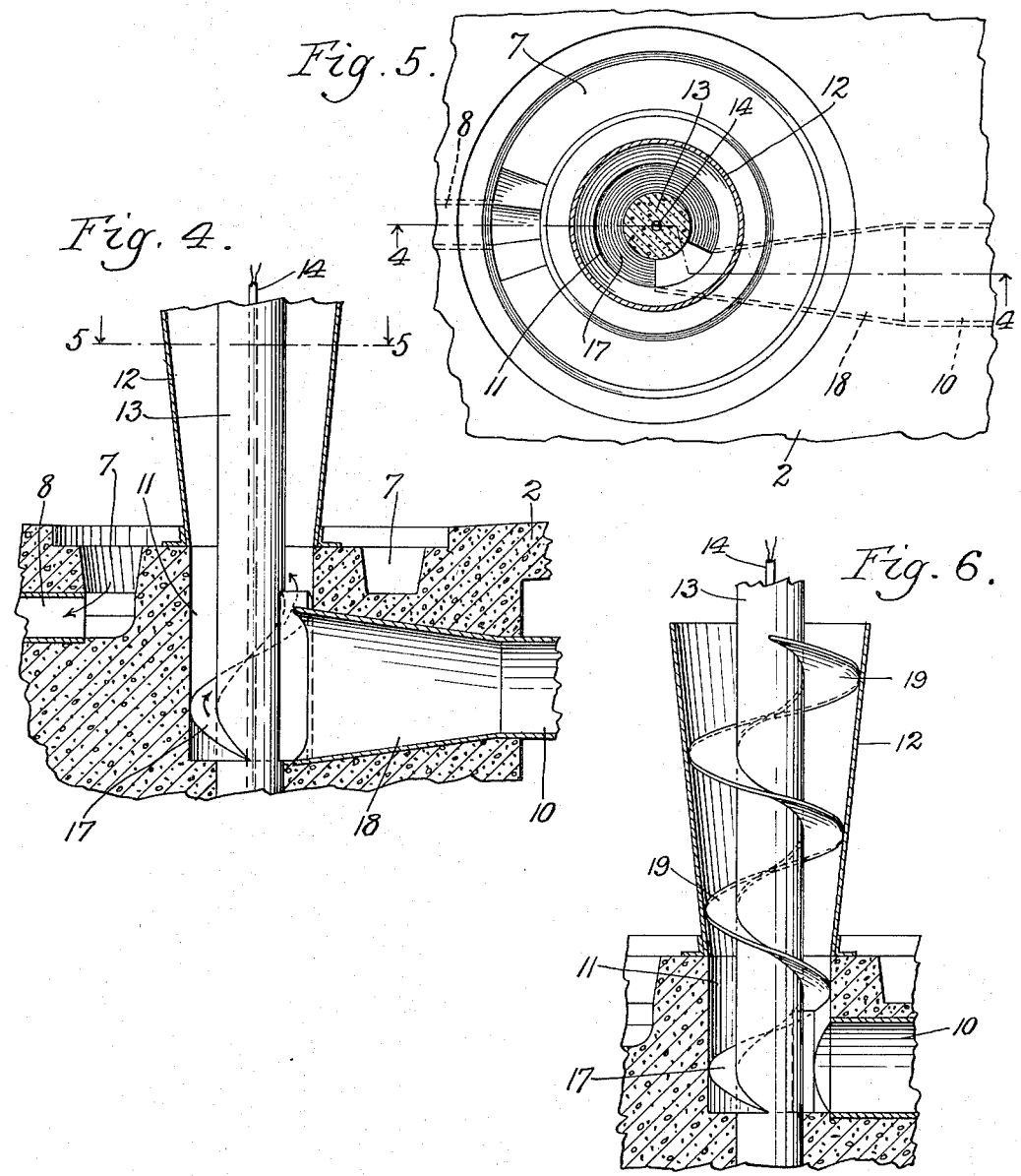

Patented Nov. 23, 1937

2,099,914

UNITED STATES PATENT OFFICE 2,099,914

METHOD OF AND APPARATUS FOR INFLUENT SUPPLY

Ferdinand F. Waechter and Harold F. Watson, Philadelphia, Pa., assignors to Link-Belt Company, Chicago, Ill., a corporation of Illinois Application May 13, 1936, Serial No. 79,486

4 Claims. (Cl. 210—55)

This invention relates to an apparatus and a process for introducing fluids to tanks. In the particular form shown herewith it is primarily adapted for use in introducing influent to a settling tank or basin in which material is to be settled out from a body of liquid within a tank.

It has for one object to provide a process and means for introducing the liquid to the tank and for causing it to spread laterally, when free to do so, within the tank. It has for another object to set up motion of the influent itself before it is introduced into the body of liquid within the tank by being discharged from the effluent conductor, which motion, when free to do so, will continue and cause an even distribution and spreading out of the influent material throughout or within the tank. Another object of the invention is to set up within the influent pipe a rotary or circular motion which will provide a nearly uniform vertical velocity in the pipe, and which, as the liquid emerges from the pipe, will be directed in a generally lateral or horizontal direction and cause the liquid when free to do so to spread out laterally throughout the tank and to be distributed uniformly.

Other objects of the invention will appear from time to time in the specifications and claims.

The invention is illustrated more or less diagrammatically in the accompanying drawings, wherein:—

Figure 1 is a transverse vertical section illustrating one type of tank to which the influent device and process of the present invention may be applied;

Figure 2 is an enlarged sectional detail illustrating the influent discharge of Figure 1;

Figure 3 is a horizontal sectional detail taken at line 3—3 of Figure 2;

Figure 4 is a vertical sectional detail showing a modified form of influent discharge;

Figure 5 is a transverse horizontal sectional detail, taken at line 5—5 of Figure 4;

Figure 6 is a view generally similar to Figures 2 and 4, illustrating a further modification.

Like parts are designated by like characters throughout the specification and drawings.

As illustrated the invention is applied to a circular settling tank. It might be applied to tanks of many other designs and is not limited to the particular application shown.

The tank to which the invention is applied for purposes of illustration comprises a side wall 1, a floor or bottom 2, an overflow trough 3, bounded on its inner edge with an inner wall 4 terminating in an adjustable weir 5 and bounded on its outer edge by a wall section 6 which is in effect a continuation of the side wall 1 of the tank. In its bottom the tank may be provided with a sludge hopper or trough 7 from which sludge may be withdrawn in any suitable manner, for example, through a sludge withdrawal conduit or pipe 8. Liquid is brought to the tank through an influent conduit which, as shown, may comprise an upper or generally vertical section 9, a horizontal section 10 and a generally vertical portion 11. This latter may extend into the tank, as shown, and may be outwardly flared to form a funnel 12. It is not essential to the invention that the portion of the influent conduit lying within the tank should be flared but it is normally preferable to make it so. A column 13 may be positioned within the tank, may lie within the funnel 12 and extend upwardly to any desired point. For some purposes it will be carried upwardly to a point above the surface of liquid within the tank and it may carry all or a portion of a collecting mechanism which may be associated with the tank. An electric conduit 14 may be positioned upon the interior of the column.

As shown in Figure 1, an adjustable baffle 15 may be positioned upon the column 13 to be stationary or to be moved upwardly and downwardly with respect to the discharge opening of the funnel 12. For some purposes this baffle may be used, and it may be omitted entirely.

16, 16 are diffuser vanes supported preferably upon the column 13 and set at an angle to its axis. These vanes may be omitted entirely. When present they tend to prevent direct upward movement of liquid and tend to cause the incoming liquid to be diffused throughout the body of liquid within the tank. The diffuser vanes and the baffle may both be present. One or the other may be present or they may both be omitted.

The bottom of the vertical section 11 of the influent conduit is provided with a generally helical portion 17. Thus the material entering through the pipe 10 and moving into the portion 11 comes into an annular space defined by the interior surface of the portion 11 and the exterior surface of the column 13. Since the bottom of this annular space inclines upwardly along a generally helical direction, the influent takes up a helical motion as it moves upwardly, through the portion 11 and thereafter it continues in a helical or spiral motion as it continues along and through the funnel 12.

In the modified form shown in Figures 4 and 5 there is inserted between the generally horizontal portion 10 of the influent conduit and the generally vertical portion 11, an intermediate section 18 which is flattened vertically so that its greatest diameter is in a vertical plane and its least diameter is in a horizontal plane, and the entire section 18 is off-set laterally from the vertical axis of the column and funnel as indicated in the plan view of Figure 5, and thus, as the influent leaves the section 10, instead of being introduced more or less symmetrically into the space 11, it comes in at the side of that space.

In the modified form of Figure 6, the arrangement of the sections 10, 11 and 12 is substantially that shown and described in connection with Figure 2, except that at the termination of the spiral floor or bottom portion 17, a spiral continuation member 19 is inserted. This member is of such width that one edge is in contact with the interior of the funnel 12 while the other edge is in contact with the exterior of the column 13 and thus all of the liquid flowing upward is guided practically to its point of exit from the funnel by the spiral continuation member 19. While but a single spiral or helical member is shown, one or more additional spirals might be inserted. While the spiral continuation member 19 is shown as comprising sufficient length to accomplish several turns about the column, it might be either longer or shorter. It might be of such length as to accomplish only a small fraction of one turn and thus would amount merely to a small extension of the floor portion 17.

It will be realized that whereas we have shown and described a practical operative device, nevertheless many changes might be made in the size, shape, number and disposition of parts without departing from the spirit of the invention and we wish, therefore, that our showing be taken as in a sense diagrammatic.

An almost infinite number of detailed changes in the structure might be made. The shape of the conduits might be changed. The shape and arrangement of the spiral sections might be altered and the relative proportions of the parts might be changed. The invention is not limited to any particular structural arrangement so long as means are provided for causing the liquid as it flows to its point of exit from the influent funnel or analogous member, for discharge into the tank, to assume a helical, spiral or rotary movement in addition to its upward movement to the point of discharge.

The use and operation of the invention are as follows:

Whatever form of tank or other similar apparatus is used in connection with the device and process of the present invention, there will ordinarily be some container, full or partially full of liquid, and influent means for conveying other liquid to the container so that the influent is discharged into a body of liquid. Whatever shape the influent discharge member takes, it comprises in general means for giving to the influent liquid a rotary or circular motion, that is to say, a motion by means of which some centrifugal action is set up which brings about the uniform upward velocity in the conduit and thus when the liquid leaves the influent conduit and passes into the body of liquid within the container, it tends to move and to spread out equally, radially or laterally. In devices of this sort, where influent liquid is discharged into a body of liquid within a tank through an influent conduit and connection from below, the normal tendency of the influent current would be to move bodily upward, undiffused, to the surface of the tank. The circular or rotary motion which is set up by the device and process of the present invention combats and counteracts this tendency and causes diffusion and a general spreading out in a generally radial direction and this result is accomplished whether or not the device through which the influent is finally discharged into the tank comprises a relatively short helical section, such as that shown in Figures 2 and 4, or a definitely longer spiral section such as that shown in Figure 6, or a spiral or helical section of any other size or shape. Whatever the details of the mechanism, means are provided well within the influent conduit, for setting up this circular or rotary motion and usually this means is included in the final section of the influent conduit, which section is generally vertically positioned. For some purposes either the baffle or the diffuser vanes or both, as shown in Figure 2, may be included to enhance the diffusing effect and to resist any tendency of the entering liquid to move bodily upward, undiffused.

The liquid being discharged into the tank possesses considerable kinetic energy, due to its weight and due to the velocity with which it is moving. If the liquid is allowed to flow directly into the tank it has been found that it is difficult to baffle it, after it has entered the tank, efficiently and to prevent by such baffling localized high velocity currents across various parts of the tank; such currents cause short circuiting and loss of settling efficiency.

This tendency to short circuiting and the failure of diffusion or the accomplishment of only incomplete diffusion, has in the past been combatted by introducing the liquid into the tank through a vertical flaring tube. This alone does not solve the problem because the liquid may discharge unevenly and may crowd upward in one or another part of the tube at a high velocity and even flow of the liquid and loss of velocity and consequent even diffusing does not occur. Hence such devices alone have not solved the problem.

The spiral, helical or rotary flow provided by the apparatus and method of the present invention consists in converting only sufficient of the kinetic energy of the liquid which is being introduced into the tank in the vertical direction to enable the liquid to rise in a vertical section, preferably somewhat larger than the influent conduit itself, and preferably flaring to a larger section toward the top into the body of the tank. The unconverted portion of the kinetic energy possessed by the liquid is then still exerted in a lateral or horizontal direction against the sides of the final influent member, for example, the funnel 12, and the liquid is constrained by the tube or funnel to revolve horizontally in the tube while rising to its top. This circular motion in the tube tends to smooth out any inequalities in upward velocities of the liquid in the different parts of the tube and cause the liquid to have the same upward velocity throughout its entire horizontal cross-section. When the rising liquid reaches the top of the vertical influent tube, the tube no longer constrains it and the direction of all portions of the liquid tends to become tangential to its previous circular or rotary path and the liquid moves in a direct line, modified only slightly by the contact with the liquid already in the tank, towards the periphery of the tank.

Experience shows that practical results consistent with the theory set out here are obtained.

Baffles may be used if desired, but experiments indicate that these may be very much simplified or dispensed with all together.

We claim:

1. In combination, a tank, means for discharging liquid into it, said means comprising an influent conduit discharging upwardly into said tank and having a helical shape, whereby liquid passing through it is caused to move along a helical path.

2. In combination, a tank, means for discharging liquid upwardly into it, said means comprising an influent conduit, flaring to its point of discharge and having a spiral shape, whereby liquid passing through it is caused to move along an expanding spiral path.

3. In combination with a tank, adapted to contain liquid, an influent conduit discharging liquid freely into said tank, the discharge section of said conduit including an annular chamber, said chamber shaped with a helically disposed bottom, whereby liquid passing through it is caused to move along a helical path.

4. The method of diffusing an incoming current of liquid throughout a body of liquid which comprises the steps of directing the influent column of liquid along a generally horizontal path, then gradually changing its direction of flow to a generally vertical path, then gradually increasing the cross sectional area of the column as it proceeds forwardly, then imparting to the expanded column of liquid a rotary movement about its longitudinal axis of flow and then discharging the column of liquid directly into the main body of the liquid.

HAROLD F. WATSON.
FERDINAND F. WAECHTER.